May 22, 1923.
H. E. TWOMLEY
REDUCTION GEAR
Filed March 1, 1922
1,456,200
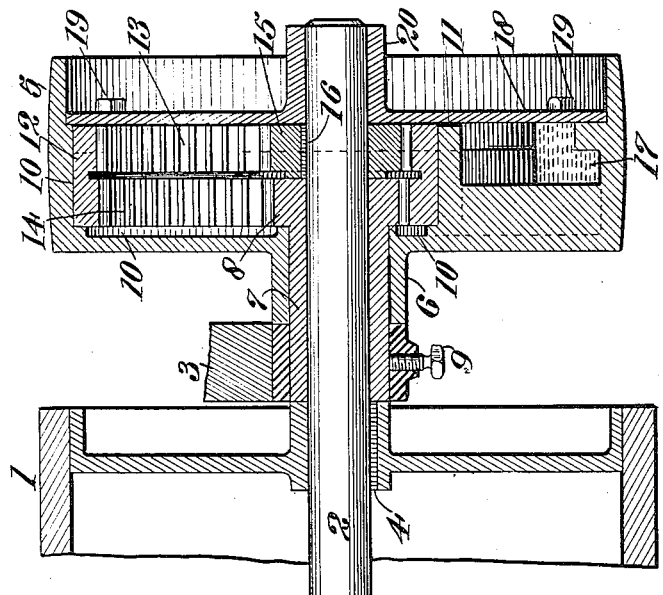
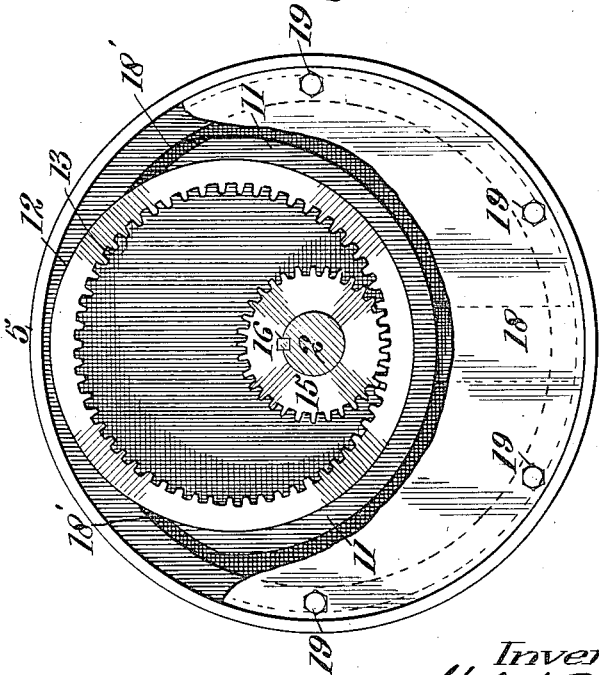

Patented May 22, 1923.

1,456,200

UNITED STATES PATENT OFFICE.

HERBERT E. TWOMLEY, OF RIVERSIDE, CALIFORNIA, ASSIGNOR TO GEORGE D. PARKER, OF RIVERSIDE, CALIFORNIA.

REDUCTION GEAR.

Application filed March 1, 1922. Serial No. 540,182.

*To all whom it may concern:*

Be it known that I, HERBERT E. TWOMLEY, a citizen of the United States, residing at Riverside, in the county of Riverside and State of California, have invented certain new and useful Improvements in Reduction Gears, of which the following is a specification.

This invention relates to a simple reduction gear construction, whereby considerable difference in the speed of revolution of a co-operating belt wheel, or pulleys, or gears, or cranks, or any revolving members about a shaft may be accomplished by a very simple mechanism.

The principal object of this invention is to provide an internal ring gear eccentrically mounted within a pulley, and which has co-operating connection with the pulley shaft, and is in turn movable on its bearing seat enabling a great gear reduction to be accomplished between the pulley and shaft.

A further object is to provide a construction wherein the reduction gear mechanism is lubricated at all times, and wherein a pinion associated with the shaft is located internally of the ring gear, thus affording a number of teeth in engagement between the pinion and ring gear which adds strength to the construction and overcomes wear between the intermeshing teeth.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Figure 1 is a view in broken side elevation of the pulley illustrating one embodiment of my invention in connection therewith.

Figure 2 is a vertical sectional view of a drive and driven pulley mounted on a shaft and illustrating an embodiment of my invention in connection therewith.

Referring more particularly to the several views of the drawings wherein like characters of reference designate corresponding parts, 1 indicates a driven pulley carried on one end of the shaft 2 supported in a hanger 3, the pulley being keyed to the shaft to rotate therewith as at 4. A drive pulley 5 is associated with the shaft 2 and the same is provided with a tubular hub 6 for receiving the hub 7 of a pinion gear 8, the hub 7 being tubular in form and adapted for receiving the shaft 2. A set screw or other means 9 is associated with the hanger for engaging the hub 7 of gear 8 to retard its rotation within the hanger and relatively to the shaft 2. The pulley 5 is provided in its outer face with a circular depression 10 arranged eccentrically of the axis of rotation of the pulley 5, and through which the shaft 2 extends. The wall 11 of the depression 10 forms an annular track or guide within which is rotatably mounted the body 12 formed on its interior surface with a pair of internally toothed ring gears 13 and 14. The ring gear 14 is of a diameter smaller than the ring gear 13, i. e. contains a lesser number of teeth, and the teeth thereof intermesh with the teeth of the pinion 8 which is received therein, as in Figure 2 of the drawings.

Intermeshing with the teeth of the ring gear 13 are the teeth of a second pinion gear 15 which is of a diameter larger than the gear 8, i. e. has a greater number of teeth, and said pinion 15 is keyed as at 16 to the shaft 2. Formed in the interior of the pulley 5 at a point opposite the recess or depression 10 is a lubricant containing sump 17, which communicates at its opposite ends through ports 18' with the chamber 10 and supplies lubricant to enable the ring gears 13 and 14 to operate as a unit on their supporting track and to reduce wear between the engaging teeth of the pinions and said ring gears. The face plate 18 closes the outer open portion of the depression 10 and sump 17, and is secured to the pulley 5 by the bolts 19, the plate having a hub 20 which bears on the ends of the shaft 2.

Power being applied to the pulley 5, the same is transmitted to the pulley 1 through the shaft 2, dependent on the speed of rotation of the pulley 5 and the speed of rotation of the pinion 8, as the adjustment of the set screw 9 enables the rotation of the pinion 8 to be varied. Assuming the pinion 8 to be held or clamped stationary, the same causes the ring gear 14 to revolve in its track, and said gear in turn causes the ring gear 13 to revolve, which transmits power through the pinion 15, which in turn drives the shaft 2 and driven pulley 1.

Having thus described my invention, what I claim and desire to protect by Letters Patent of the United States is:—

1. A reduction gear including a rotatable shaft, a drive and a driven part mounted thereon, one free to rotate thereon and the other to rotate therewith, one of said parts provided on its interior with an eccentrically located annular guide, an internal ring gear within said part and annularly movable therein on said guide and through which said shaft extends, a pinion keyed to the shaft and intermeshing with said ring gear, a second ring gear rotatable with the first, and a pinion intermeshing with said second ring gear.

2. A reduction gear including a rotatable shaft, a drive and a driven member mounted thereon, one free to rotate thereon and the other to rotate therewith, one of said members provided on its interior with an eccentrically located annular guide, a pair of united internal ring gears within said member and annularly movable therein on said guide and through which said shaft extends, a pair of pinions on said shaft, one engaging each internal gear, one of said pinions keyed to rotate with said shaft, and means for controlling the rotation of the other pinion.

3. A reduction gear including a rotatable shaft, a drive and a driven wheel mounted thereon, one free to rotate thereon and the other to rotate therewith, one of said wheels provided on its interior with an eccentrically located annular guide, a pair of united internal ring gears of different internal diameters within said wheel and annularly movable therein, on said guide and through which said shaft extends, a pair of pinions on said shaft of different diameters and one co-operating with each ring gear, one of said pinions rotatable with the shaft and the other adapted for rotation thereon, and means for retarding the rotation of said latter gear.

4. A reduction gear including a rotatable shaft, a drive and a driven wheel mounted thereon, one for free rotation thereon, and the other for rotation therewith, one of said wheels formed with an eccentrically mounted annular guide on its interior and also formed with a lubricant containing chamber communicating with the interior of said guide, a body of lubricant within the said chamber, an internal ring gear within said guide and movable annularly thereover, and through which said shaft extends, a pinion gear on said shaft intermeshing with said ring gear, and a second ring gear and pinion gear in intermeshing relation, said second ring gear being rotatable with said first ring gear.

5. A reduction gear including a rotatable shaft, a rotatable gear housing mounted thereon, and free to rotate thereon, said gear housing provided on its interior with an eccentrically located annular guide, an internal ring gear within said gear housing and annularly movable therein on said guide and through which said shaft extends, a pinion keyed to the shaft and intermeshing with said ring gear, a second ring gear rotatable with the first, and a pinion gear intermeshing with said second ring gear.

6. A reduction gear including a rotatable shaft, a rotatable gear housing mounted thereon, and free to rotate thereon, said housing provided on its interior with an eccentrically located annular guide, a pair of united internal ring gears within said housing and annularly movable therein on said guide, and through which said shaft extends, a pair of pinions on said shaft, one engaging each internal gear, one of said pinions keyed to rotate with said shaft and means for preventing the rotation of the other pinion.

7. A reduction gear including a rotatable shaft, a rotatable gear housing mounted thereon, and free to rotate thereon, said gear housing provided on its interior with an eccentrically located annular guide, a pair of united internal ring gears of different internal diameters within said housing and annularly movable therein on said guide and through which said shaft extends, a pair of pinions on said shaft of different diameters and one co-operating with each ring gear, one of said pinions rotatable with the shaft and the other adapted for rotation thereon, and means for preventing the rotation of said latter gear.

8. A reduction gear including a rotatable shaft, a rotatable gear housing mounted thereon and for free rotation thereon, said housing formed with an eccentrically mounted annular guide on its interior and also formed with a lubricant containing chamber connecting with the interior of said guide, a body of lubricant within said chamber, an internal ring gear within said guide and movable annularly thereover, and through which said shaft extends, and a pinion gear on said shaft intermeshing with said ring gear, and a second ring gear and pinion within said housing in intermeshing relation.

9. A reduction gear including a rotatable shaft, a rotatable drive drum mounted for free rotation thereon, a ring gear, said drum formed with an eccentrically located guide chamber annularly movable over said ring gear, a lubricant reservoir in the central opening of said ring gear, through which said shaft extends, a pinion gear on said shaft intermeshing with said ring gear, and a second ring gear and pinion in intermeshing relation.

In testimony whereof I have signed my name to this specification.

HERBERT E. TWOMLEY.